No. 614,357. Patented Nov. 15, 1898.
H. WYSS.
BEARING.
(Application filed May 1, 1897.)
(No Model.)

Witnesses.
Robert Everett.
R. D. Johnston Jr.

Inventor.
Henri Wyss.
By James L. Norris.
Atty.

UNITED STATES PATENT OFFICE.

HENRI WYSS, OF LEVALLOIS-PERRET, FRANCE.

BEARING.

SPECIFICATION forming part of Letters Patent No. 614,357, dated November 15, 1898.

Application filed May 1, 1897. Serial No. 634,776. (No model.)

*To all whom it may concern:*

Be it known that I, HENRI WYSS, a citizen of Switzerland, residing at 116 Rue Chevalier, Levallois-Perret, (Seine,) France, have invented certain new and useful Improvements in Bearings, (for which I have obtained patents in France September 28, 1896, No. 260,030; in Belgium December 21, 1896, No. 125,288, and in England December 31, 1896, No. 30,150,) of which the following is a specification.

My invention relates to improvements in the construction of bearings for rotating shafts or the like, and has for its object to provide bearings in which friction will be reduced to a minimum, which may be cheaply constructed, and which may be readily adapted to any bearings now in use.

Figure 1:
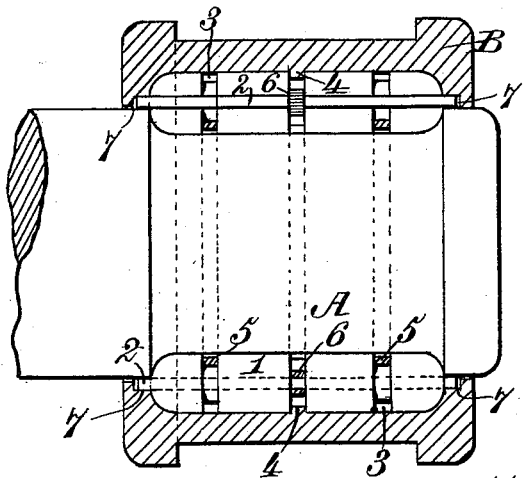
Figure 2:
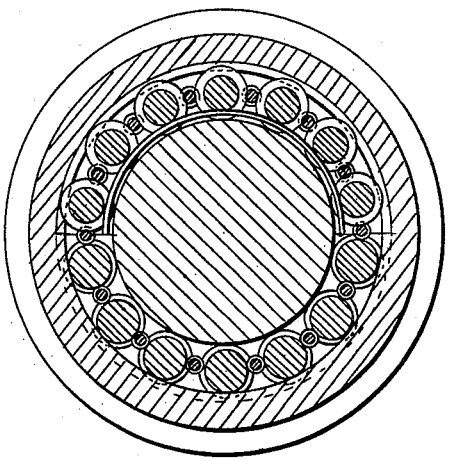
Figure 3:
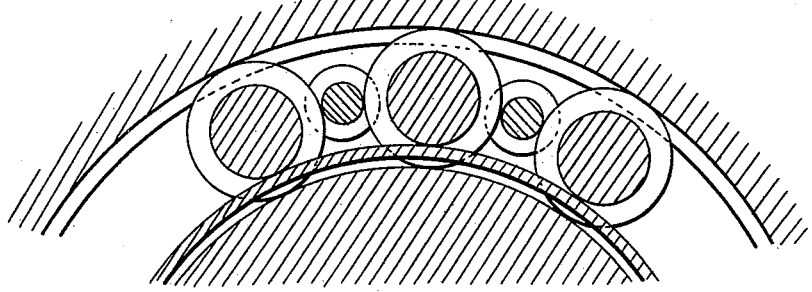

In the accompanying drawings, illustrating my invention, Figure 1 is a sectional view through the axis of the shaft. Fig. 2 is a cross-section of the same; and Fig. 3 is a similar view, enlarged, of a portion of the bearing shown in Fig. 2.

In said drawings the letter A indicates the shaft, and B the bearing, which is formed in two parts united in any well-known manner. Said shaft A may be in the form of a collar-shaft, as shown, or it may be perfectly smooth.

The bearing B is separated from its shaft by means of contact-rollers 1, preferably of steel, which in their turn are kept apart from each other by intermediate rollers 2 of smaller diameter. The contact-rollers 1 are in the form of cylinders with flat or rounded ends, and they are provided with circular grooves 3, which are preferably rectangular, as shown. In the drawings I have represented three of these grooves on each roller 1, although a greater or less number may be employed. The intermediate rollers 2 are likewise cylindrical in form, but they are of much less diameter than the contact-rollers 1 and have no grooves. To prevent any displacement parallel to the shaft of these intermediate rollers, I provide at or about the centers of each of the said rollers an annular rib 6, which takes into the central groove 3 of the contact-rollers 1. The rollers 2 have their opposite ends mounted, respectively, in recesses 7, provided between the shaft and bearing. To keep the axes of the contact-rollers 1 parallel to that of the shaft and to prevent longitudinal displacement of the said rollers, a projecting rib 4 is provided on the interior of each half of the bearing, which rib will form a continuous annular projection when the two parts of the bearing are brought together. This rib is adapted to fit in the central groove 3 of the contact-rollers 1 and so prevent them moving obliquely to the shaft. The intermediate rollers 2 are, as shown, longer than the contact-rollers 1 and at each end are mounted in a recess provided between the shaft and a flange formed in the end of the bearing, as shown in Fig. 1. To further assist in keeping the rollers 1 parallel to each other and to the shaft, I provide metal rings 5, two being shown, made in two parts and adapted to fit in the end grooves 3 of the contact-rollers. These rings, however, do not contact with the shaft, as plainly shown in Figs. 2 and 3. The rollers are thus arranged to fit compactly together, and the shaft, if smooth, can be withdrawn from its bearing without displacing any of them, the rollers being prevented from falling out of place by the rings 5. There is no friction between any two surfaces parallel to the shaft, the sole friction being on the cheeks of the grooves, which, however, are at right angles to the axis of the shaft, and therefore have no weight to support, so that no injurious wearing can result therefrom.

In practice the external dimensions of my bearing are the same for the same shaft as those of the ordinary bearings without rollers. As a result my bearing can be substituted for the ordinary bearing without its being necessary to alter either the bearing or the shaft. Further, in my construction I can dispense with all projecting ribs on the shaft, I can employ the maximum number of rollers to a given diameter of shaft, and I provide for always keeping these rollers parallel with each other and with the shaft.

Having thus described my invention, what I claim is—

A journal-bearing having an internal bearing-surface, a shaft journaled therein, an inner annular rib located centrally of said bearing-surface, rings encircling said shaft near each end of said bearing, a series of cylindrical contact-rollers interposed between said bearing-surface and shaft and having near their ends annular grooves adapted to receive said rings, and each provided in its central portion with an annular groove, and a series of cylindrical rollers of smaller diameter than and interposed between said contact-rollers and having their opposite ends mounted, respectively, in recesses provided between the shaft and bearing and each having a central annular rib fitting in the central groove of said contact-rollers, substantially as described.

In testimony whereof I have hereunto set my hand in presence of two subscribing witnesses.

HENRI WYSS.

Witnesses:
GEORGES DELOM,
J. ALLISON BOWEN.